Aug. 26, 1969 — P. KLINGENSTEIN — 3,463,064
CAMERA WITH FILM MARKING STRUCTURE
Filed Feb. 20, 1967
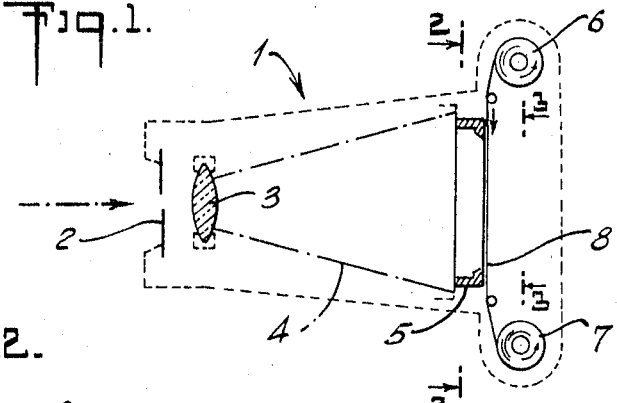
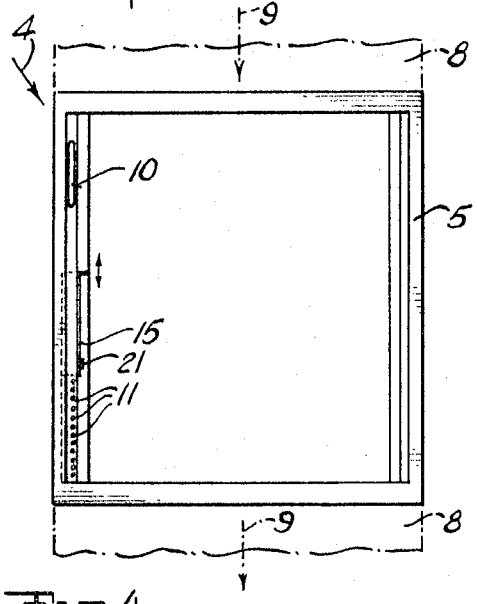
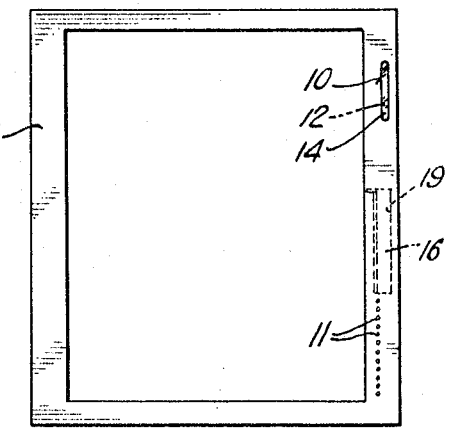
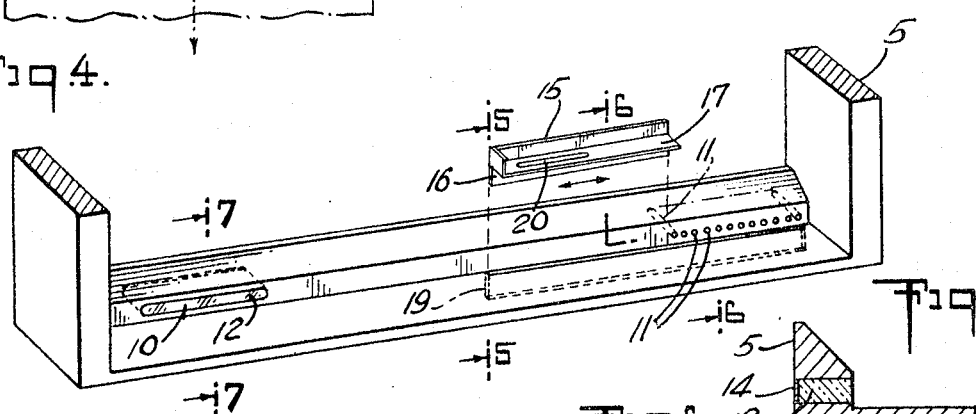
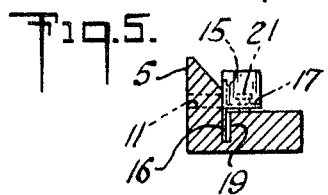
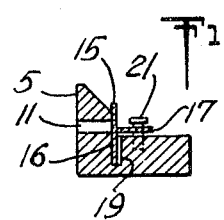
INVENTOR
PAUL KLINGENSTEIN
BY Edward [signature]
ATTORNEY United States Patent Office 3,463,064
Patented Aug. 26, 1969

3,463,064
CAMERA WITH FILM MARKING STRUCTURE
Paul Klingenstein, Scarsdale, N.Y., assignor to Berkey Photo, Inc., New York, N.Y.
Filed Feb. 20, 1967, Ser. No. 617,155
Int. Cl. G03b 17/24
U.S. Cl. 95—1.1    3 Claims

ABSTRACT OF THE DISCLOSURE

Camera with masking frame for the picture to be taken on the film in which the masking frame is apertured to pass light through the lens to the film outwardly of the picture area. A row of apertures have a slider to cover one or more of the apertures. Another aperture is backed with a solid transparent material to which is attached a transparent sheet with opaque indicia thereon. The light passed through the apertures is adapted to expose the film outwardly of the masked picture area.

---

The present invention relates to cameras and more particularly to a camera having an apertured exposure frame through which light is admitted to strike the marginal edge of the film being exposed when the shutter is actuated to make the usual exposure.

Heretofore cameras have been provided with a structure providing for marking the film. One such structure is shown in Smurthwaite U.S. Patent 1,821,408. In this construction a sticker bearing a transparent pocket carrying a marking strip is adapted to be attached over the camera masking frame. In this construction the marking strip is within the picture area. Further, there is no means of holding the transparent pocket tightly against the film to assure clear marking of the film. The picture area of the film passes over the outer surface of the adhesive strip and is subject to scratching or other damage by sliding contact therewith. Another prior construction is shown in Nerwin U.S. Patent 2,813,469. In the Nerwin construction a small window is provided in the masking frame in the area between pictures on the film. A light pipe made of a transparent plastic conducts light to the window from the film picture counting mechanism, the light path being interrupted by the shutter so that each picture may be successively numbered. The window is located in the masking frame so that the indicia is applied to the film between pictures and thus presents a possibility of causing film scratching as the film is passed thereover.

The present invention aims to overcome the difficulties and disadvantages of prior constructions by placing the film marking window on the side of the film so that any possible scratching of the film caused thereby will not take place in the picture area. Further, a construction is used which does not reduce the normal picture area and which assures a tight contact with the film in order to produce clear marking thereof.

In accordance with the invention this is accomplished by aperturing the masking frame of the camera along the area contacted by the sides of the moving film. A single aperture or a plurality of apertures may be provided. The marking aperture may be fitted with marking indicia or may be in unimpeded opening. Means may be provided to cover one or more apertures before each roll of film is placed in position. The marking through one aperture may be different than through any other aperture and the apertures may be placed on either or both sides of the film.

Objects and advantages of the invention will be apparent from the following description and from the accompanying drawings which show, by way of illustration, embodiments of the invention.

In the drawings:

FIGURE 1 is a vertical sectional view of a camera according to the invention.

FIGURE 2 is an enlarged view taken along the line 2—2 of FIGURE 1.

FIGURE 3 is a view corresponding to FIGURE 2 and taken along the lines 3—3 of FIGURE 1.

FIGURE 4 is a further enlarged perspective view taken generally in the direction of the arrow 4 of FIGURE 2. A slider is shown as raised from its position in the frame in order to reveal the area thereunder.

FIGURE 5 is a sectional view taken along the line 5—5 of FIGURE 4.

FIGURE 6 is a sectional view taken along the line 6—6 of FIGURE 4.

FIGURE 7 is a somewhat enlarged sectional view taken along the line 7—7 of FIGURE 4.

Referring to the drawing there is shown in FIGURE 1 a camera 1 including a shutter 2, a lens 3, a bellows or equivalent light housing 4 and a masking frame 5. Behind the masking frame 5 is film transporting means including rollers 6 and 7 adapted to pass a film 8 across the masking frame 5.

In FIGURE 2, the arrows 9—9 indicate the direction in which the film 8 is moved over the masking frame 5. At the side of the masking frame 5 is an identification window aperture 10 and one or more other apertures 11. The identification window aperture 10, as may be seen in detail in FIGURE 7, may be provided with a transparent backing member of plastic or equivalent material 12 at the front of which may be attached a film 14 carrying reduced indicia thereon such as the name of the camera owner. A plurality of other apertures 11 may also be positioned in the frame on the same or on the opposite side as is positioned the window aperture 10. The axes of the apertures 10 and 11 are such that light passed through the lens 3 and directed to the film 8 will pass through the apertures. In order that one or more of the apertures 11 may be covered a slider 15 is provided. The slider 15 may be formed of a pair of intersecting flat members 16 and 17 positioned at approximately right angles to each other. The flat member 16 is adapted to be received in a slot 19 in the frame 5. The flat member 17 may be slotted as indicated at 20 to receive a rivet 21 positioned for slideable movement of the slider 15 so that it will cover one or more of the apertures 11. The slider 15 may be shaped so as to provide a frictional engagement with the frame 5 so that it will stay in the desired position, or, alternately, spring means (not shown) may be used so that the slider 15 will be maintained in a set position.

In exposing the film in taking the usual picture light admitted by the shutter 2 and passed through the lens 3 impinges upon the apertures 10 and 11 and passes therethrough to provide exposed areas on the film 8. Preferably the apertures 10 and 11 are placed on one or both sides at the edges of the film 8 so that if there is any roughness presented by the edges of the apertures there will be no scratching across the picture area of the film. Furthermore the side of the film advantageous for use in that the indicia will be placed on the film outwardly of the picture area in a location that will not be removed as might be the case if positioned between frames in which event a cutting to separate the pictures might eliminate the indicia for one frame.

The window aperture 10 may have a film attached by adhesive or the like to the transparent backing member 12. Of course, if a signature or name is on the film, it would be greatly reduced in size. However, upon magnification, the name may be again revealed. In using the apertures 11 the slider 15 may be moved so as to cover one or more of the apertures and thereby provide a marking which may be correlated with the location or subject of a particular roll of the pictures.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. In a camera having a housing supporting a lens in spaced relationship from its masking frame, the inner edge of the masking frame defining the outer edge of the picture area, shutter means, and film transport means, the improvement wherein the frame includes means defining at least one aperture in the light path between the lens and the path of the film so that when a film is in position in the camera and the shutter is opened for an exposure of the film a portion of the light admitted through the lens is passed through said frame aperture to the film for the exposure thereof, and a slider is provided which is adapted to be moved to cover one or more apertures.

2. A camera according to claim 1 in which a rivet member is provided to hold the slider in position.

3. A camera according to claim 1 in which an additional elongated aperture is provided, a transparent member is positioned in the elongated aperture, and a film bearing indicia is positioned against the transparent member.

References Cited

UNITED STATES PATENTS

| | | | |
|---|---|---|---|
| 1,362,787 | 12/1920 | Congaware | 95—1.1 |
| 1,375,815 | 4/1921 | Bethke | 95—1.1 |
| 1,411,370 | 4/1922 | Nordin | 95—1.1 |
| 1,475,006 | 11/1923 | Faber | 95—1.1 |
| 1,821,408 | 9/1931 | Smurthwaite | 95—1.1 |
| 2,813,469 | 11/1957 | Nerwin | 95—1.1 |
| 3,029,717 | 4/1962 | Hildebrandt | 95—1.1 |

NORTON ANSHER, Primary Examiner

D. B. WEBSTER, Assistant Examiner